United States Patent
Edwards, III et al.

(10) Patent No.: US 11,307,869 B2
(45) Date of Patent: Apr. 19, 2022

(54) IDENTIFYING A TRANSPORT ROUTE USING AN INFORMATION HANDLING SYSTEM FIRMWARE DRIVER

(71) Applicant: Dell Products L.P., Round Rock, TX (US)

(72) Inventors: William Carl Edwards, III, Round Rock, TX (US); Sankara Rao Gara, Cedar Park, TX (US); Aniruddha Suresh Herekar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 302 days.

(21) Appl. No.: 16/507,611

(22) Filed: Jul. 10, 2019

(65) Prior Publication Data

US 2021/0011735 A1    Jan. 14, 2021

(51) Int. Cl.
*G06F 9/445* (2018.01)
(52) U.S. Cl.
CPC .................................... *G06F 9/445* (2013.01)
(58) Field of Classification Search
None
See application file for complete search history.

(56) References Cited

U.S. PATENT DOCUMENTS

| | | | | |
|---|---|---|---|---|
| 10,185,828 B2 * | 1/2019 | Vidyadhara | ........... | G06F 21/575 |
| 10,776,286 B1 * | 9/2020 | Kulchytskyy | ............ | G06F 8/65 |
| 2015/0154029 A1 * | 6/2015 | Lu | .......... | G06F 9/4403 713/2 |
| 2015/0154092 A1 * | 6/2015 | Chen | ...... | G06F 9/4401 713/2 |
| 2019/0384614 A1 * | 12/2019 | Kondapi | ............... | G06F 9/4408 |
| 2020/0042710 A1 * | 2/2020 | Liu | ...... | G06F 9/44505 |
| 2020/0133652 A1 * | 4/2020 | Bhimanadhuni | ......... | G06F 8/63 |
| 2020/0136901 A1 * | 4/2020 | Ballard | ............... | G06F 9/45558 |
| 2020/0242014 A1 * | 7/2020 | Bhatia | ................. | G06F 11/3688 |
| 2021/0011735 A1 * | 1/2021 | Edwards, III | ........... | G06F 9/445 |

\* cited by examiner

*Primary Examiner* — Tanh Q Nguyen
(74) *Attorney, Agent, or Firm* — Baker Botts L.L.P.

(57) ABSTRACT

Methods, systems, and computer programs for receiving, by an information handling system firmware driver, a request for a feature associated with information handling system firmware, the feature stored in a baseboard management controller; determining a transfer size associated with the feature; identifying a plurality of connectivity points, each of the plurality of connectivity points communicatively coupling the information handling system firmware driver to the baseboard management controller, and each of the plurality of connectivity points associated with a bandwidth; selecting a transport route from the plurality of connectivity points based in part on the transfer size associated with the feature; and in response to selecting the transport route: transmitting the request for the feature to the baseboard management controller via the transport route; receiving the feature from the baseboard management controller via the transport route; and providing the feature to the information handling system firmware for execution.

17 Claims, 6 Drawing Sheets

IDENTIFYING A TRANSPORT ROUTE USING AN INFORMATION HANDLING SYSTEM FIRMWARE DRIVER

BACKGROUND

Field of the Disclosure

This disclosure relates generally to information handling systems, and in particular to identifying a transport route using an information handling system firmware driver.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method for identifying a transport route using an information handling system firmware driver, where the method includes receiving, by an information handling system firmware (IHSFW) driver, a request for a feature associated with IHSFW, the feature stored in a first baseboard management controller (BMC) of an information handling system (IHS); determining a transfer size associated with the feature; identifying a plurality of connectivity points, each of the plurality of connectivity points communicatively coupling the IHSFW driver to the first BMC, and each of the plurality of connectivity points associated with a bandwidth; selecting a transport route from the plurality of connectivity points, the selecting based in part on the transfer size associated with the feature; and in response to selecting the transport route: transmitting the request for the feature to the first BMC via the transport route; receiving the feature from the first BMC via the transport route; and providing the feature to the IHSFW for execution.

In one or more of the disclosed embodiments, the method further comprises determining, by the IHSFW driver, that the feature associated with the IHSFW is not stored in the first BMC; identifying a plurality of BMCs, each of the plurality of BMCs communicatively coupled to the first BMC via a network; selecting a second BMC from the plurality of BMCs, the second BMC storing the feature associated with the IHSFW; and in response to selecting the second BMC: transmitting the request for the feature to the second BMC via the network; receiving the feature from the second BMC via the network; and providing the feature to the IHSFW for execution.

In one or more of the disclosed embodiments, transmitting the request for the feature to the first BMC via the transport route further comprises: bypassing, by the IHSFW driver, a universal serial bus (USB) communicatively coupling the IHSFW to the first BMC.

In one or more of the disclosed embodiments, selecting the transport route from the plurality of connectivity points comprises: determining the bandwidth associated with each of the plurality of connectivity points; identifying, from the plurality of connectivity points, a first connectivity point having a bandwidth that accommodates the transfer size associated with the feature; determining whether the first connectivity point is in use by the IHS; and in response to determining that the first connectivity point is not in use by the IHS, selecting the first connectivity point to serve as the transport route.

In one or more of the disclosed embodiments, determining whether the first connectivity point is in use by the IHS further comprises: in response to determining that the first connectivity point is in use by the IHS: identifying, from the plurality of connectivity points, a second connectivity point that is not in use by the IHS, the second connectivity point having the bandwidth that accommodates the transfer size associated with the feature; and selecting the second connectivity point to serve as the transport route.

In one or more of the disclosed embodiments, the bandwidth that accommodates the transfer size associated with the feature comprises a bandwidth in which a least amount of data packets may be transferred from the BMC to the IHSFW driver, wherein each data packet comprises a portion of the feature.

In one or more of the disclosed embodiments, the transport route comprises at least one of: a common internet file system (CIFS); a network interface controller (NIC) buffer; a network file system (NFS); a shared memory of the IHS; a video frame buffer of the IHS; a hypertext transfer protocol (HTTP) layer; and a hypertext transfer protocol secure (HTTPS) layer.

In one or more of the disclosed embodiments, the feature associated with the IHSFW is at least one of: a unified extensible firmware interface (UEFI) executable file, diagnostics firmware, one or more configuration files, and one or more log files.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
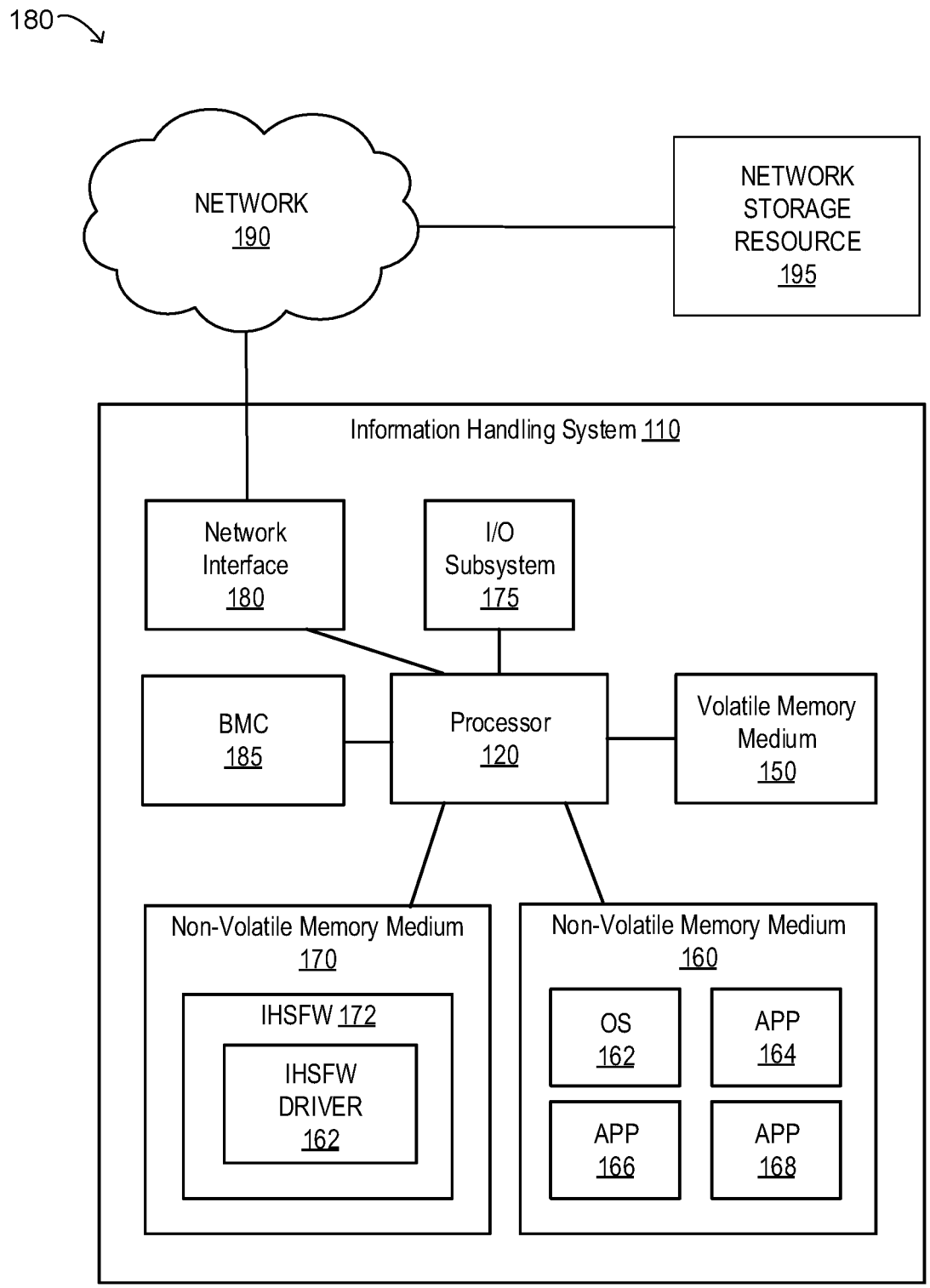
FIG. 1 illustrates a block diagram of selected elements of an embodiment of an information handling system.

This document describes a method and a system to secure an embedded controller flashing process in a computing environment. Specifically, this document describes receiving, by an information handling system firmware (IHSFW) driver, a request for a feature associated with IHSFW, the feature stored in a first baseboard management controller (BMC) of an information handling system (IHS); determining a transfer size associated with the feature; identifying a plurality of connectivity points, each of the plurality of connectivity points communicatively coupling the IHSFW driver to the first BMC, and each of the plurality of connectivity points associated with a bandwidth; selecting a transport route from the plurality of connectivity points, the selecting based in part on the transfer size associated with the feature; and in response to selecting the transport route: transmitting the request for the feature to the first BMC via the transport route; receiving the feature from the first BMC via the transport route; and providing the feature to the IHSFW for execution.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram of selected elements of an embodiment of an information handling system. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I2C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, a baseboard management controller (BMC) 185, a network 190, and a network storage resource 195. As illustrated, volatile memory medium 150, non-volatile memory media 160 and 170, I/O subsystem 175, network interface 180, and BMC 185 may be communicatively coupled to processor 120.

In one or more embodiments, one or more of volatile memory medium 150, non-volatile memory media 160 and 170, I/O subsystem 175, network interface 180, and BMC 185 may be communicatively coupled to processor 120 via one or more buses, one or more switches, and/or one or more root complexes, among others. In one example, one or more of volatile memory medium 150, non-volatile memory media 160 and 170, I/O subsystem 175, network interface 180, and BMC 185 may be communicatively coupled to processor 120 via one or more PCI-Express (PCIe) root complexes. In another example, one or more of I/O subsystem 175, network interface 180, and BMC 185 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via network 190 utilizing a suitable transmission protocol and/or standard. In a second example, network interface 180 may be coupled to a wired network. In a third example, network interface 180 may be coupled to an optical network. In another example, network interface 180 may be coupled to a wireless network.

In the example illustrated in FIG. 1, network interface 180 may be communicatively coupled via network 190 to network storage resource 195. For example, network 190 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, network 190 may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein. Although not specifically illustrated, processor 120 may include multiple processor cores, according to one or more embodiments. In one example, one or more processor cores of processor 120 may execute processor instructions from one or more of memory media 150, 160, and 170 in implementing one or more systems, one or more flowcharts, one or more methods, and/or one or more processes described herein. In another example, one or more processor cores of processor 120 may execute processor instructions via network interface 180 in implementing one or more systems, one or more flowcharts, one or more methods, and/or one or more processes described herein. Although not specifically illustrated, processor 120 may include one or more FPGAs, according to one or more embodiments.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit a user (e.g., an administrator) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 185 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be or include an application processor. In one example, BMC 185 may be or include an ARM Cortex-A processor. In another example, BMC 185 may be or include an Intel Atom processor. In one or more embodiments, BMC 185 may be or include one or more of a field programmable gate array (FPGA) and an ASIC, among others, configured, coded, and/or encoded with instructions in accordance with at least a portion of one or more of systems, one or more flowcharts, one or more methods, and/or one or more processes described herein.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions, or "features," of the processor instructions of IHSFW 172 may be transferred to volatile memory medium 150, and processor 120 may execute the one or more features of the processor instructions of IHSFW 172 via volatile memory medium 150. In yet another instance, one or more features of the processor instructions of IHSFW 172 may be stored in BMC 185 of IHS 110 and/or in several BMCs communicatively coupled via network 190.

As depicted in FIG. 1, IHSFW 172 may include IHSFW driver 162. In one or more embodiments, IHSFW driver 162 may be configured to receive a request (e.g., an "open" and/or "read" command) for a feature associated with IHSFW 172 and retrieve the requested feature such that it may be used by IHSFW 172. Requested features may include, for example, UEFI executable files, diagnostics firmware, configuration files, log files, etc. In one embodiment, IHSFW driver 162 may receive a request for a feature from IHSFW 172 executing in non-volatile memory medium 170. For example, IHSFW driver 162 may receive a request for data to support a UEFI executable file or data to support an EFI file system. In another embodiment, IHSFW driver 162 may receive a request for a feature from a user (e.g., an administrator) via an interface such as a command line interface (CLI) or Intelligent Platform Management Interface (IPMI). For example, an administrator may input an "edit" command into an EFI shell such that IHSFW driver 162 may receive the command and provide access to the file. Upon receiving a request for a feature, IHSFW driver 162 can determine a route to efficiently retrieve the requested feature.

In one embodiment, IHSFW driver 162 may retrieve the requested feature from BMC 185. Conventionally, a universal serial bus (USB) may serve as a transport for communication between IHSFW 172 and BMC 185. In particular, BMC 185 typically transports repository data to IHSFW 172 via USB such that IHSFW 172 may boot IHS 110. However, IHSFW 172 can fail to detect the repository data presented via USB, which can misalign established IHSFW 172 aliases and result in increased maintenance time and boot operations. Therefore, IHSFW driver 162 can bypass the USB communicatively coupling IHSFW 172 and BMC 185, and can identify one or more local communication connections, or "connectivity points," that may be used rather than the USB. IHSFW driver 162 can use the identified connectivity points to communicate with BMC 185 such that files may be sent to and/or received from BMC 185 upon request. In one embodiment, IHSFW driver 162 may identify which connectivity points are available (e.g., not currently in use by IHS 110) and can select a particular connectivity point, or "transport route," from the available connectivity points for transferring a feature. In particular, IHSFW driver 162 can receive a request for a feature, determine the transfer size of the feature, and select a transport route from the available connectivity points having a bandwidth that accommodates the transfer size of the feature. In other embodiments, IHSFW driver 162 may select a transport route based on file type, author, date created, date modified, or any other suitable metadata describing a requested feature.

In one embodiment, IHSFW driver 162 may retrieve the requested feature from one or more BMCs of computing environment 180. For example, IHSFW driver 162 may determine that a requested feature is not stored locally in BMC 185, has been corrupted, or is otherwise unavailable for use. Therefore, rather than retrieving the requested feature from BMC 185, IHSFW driver 162 may instead retrieve the requested feature from a different BMC over network 190. IHSFW driver 162 may identify one or more BMCs in computing environment 180 (e.g., using a routing table) that are communicatively coupled to BMC 185 via network 190, and can select a BMC storing the requested feature. Once the BMC has been selected, IHSFW driver 162 can transmit the request for the feature to the selected BMC via network 190 and can receive the requested feature from the BMC. In another embodiment, BMC 185 may identify one or more BMCs in computing environment 180, select a BMC storing the requested feature, transmit the request for the feature to the selected BMC via network 190, receive the requested feature from the selected BMC, and transmit the requested feature to IHSFW driver 162. IHSFW driver 162 is discussed in further detail with respect to FIGS. 3 and 4.

Figure 2:
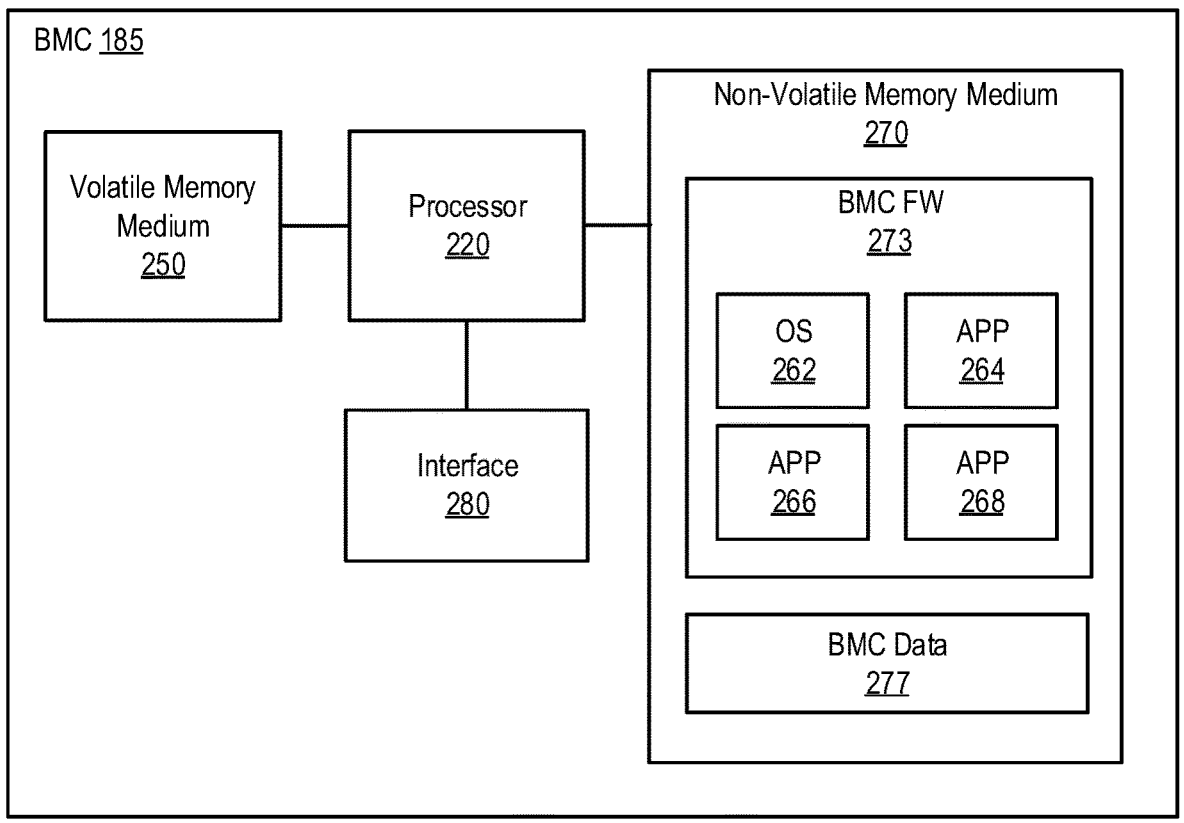
FIG. 2 illustrates a block diagram of selected elements of an embodiment of a baseboard management controller.

Turning now to FIG. 2, an example of a baseboard management controller is illustrated, according to one or more embodiments. As shown, BMC 185 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). In a second example, OS 262 may be or include a Unix-like operating system. For instance, the Unix-like operating system may be or include Linux, FreeBSD, NetBSD, OpenBSD, Minix, Xinu, or Darwin, among others. In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more buses. For instance, the one or more buses may include a USB communicatively coupling BMC 185 to IHSFW 172. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 185 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include circuitry that enables communicatively coupling to other BMCs in computing environment 180 via network 190.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, one or more flowcharts, one or more methods, and/or one or more processes described herein. For example, non-volatile memory medium 270 and/or volatile memory medium 260 may store instructions that may be executable in accordance with at least a portion of one or more systems, flowcharts, one or more methods, and/or one or more processes described herein. In one or more embodiments, processor 220 may execute instructions in accordance with at least a portion of one or more of systems, flowcharts, methods, and/or processes described herein. For example, non-volatile memory medium 270 and/or volatile memory medium 260 may store instructions that may be executable in accordance with at least a portion of one or more of systems, flowcharts, methods, and/or processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3:
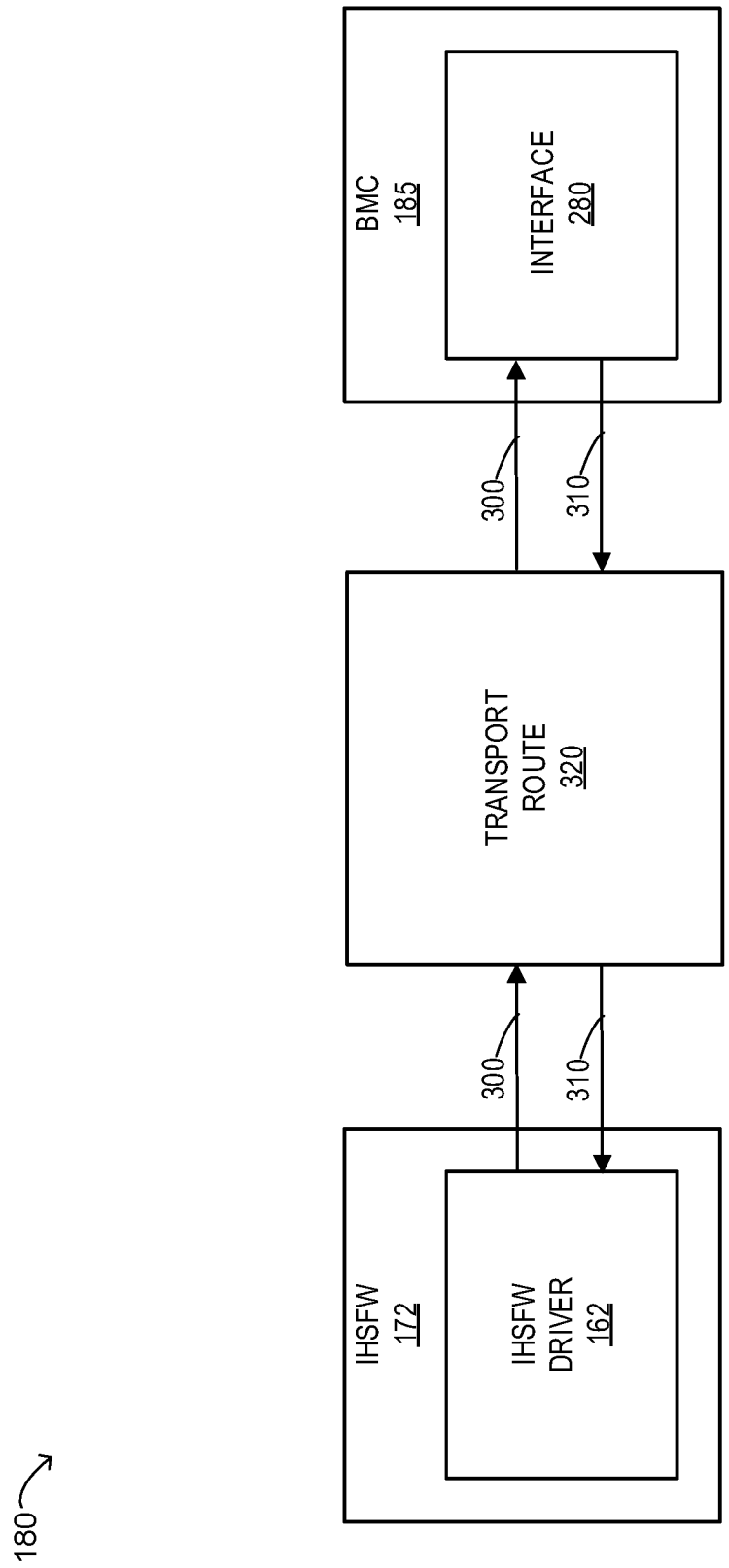
FIG. 3 illustrates a block diagram of selected elements of an embodiment for receiving a requested feature from a baseboard management controller locally using an information handling system firmware driver.

FIG. 3 illustrates a block diagram of selected elements of an embodiment for receiving a requested feature from a baseboard management controller locally using an information handling system firmware driver. In the embodiment illustrated in FIG. 3, IHSFW driver 162 may receive a request for a feature stored locally in BMC 185. In one embodiment, the request may be received from IHSFW 172 while executing in non-volatile memory medium 170 of IHS 110. For example, IHSFW 172 may require data to support a UEFI executable file while executing. In another embodiment, the request may be received from an administrator of IHS 110. For example, an administrator may request a feature in response to a firmware update or configuration change. IHSFW driver 162 can identify connectivity points through which to communicate with BMC 185 such that features may be sent to and/or received from BMC 185 upon receiving the request. IHSFW driver 162 can determine a bandwidth and a status associated with each identified connectivity point. In particular, IHSFW driver 162 can determine which of the identified connectivity points are currently unavailable (e.g., in use by IHS 110), and which of the identified connectivity points are available for transferring features. Of the available connectivity points, IHSFW driver 162 may select a connectivity point for transferring features, or "transport route 320," having a highest bandwidth to accommodate a transfer size associated with the feature. Examples of connectivity points may include a common internet file system (CIFS), a network interface controller (NIC) buffer, a network file system (NFS), a shared memory of IHS 110, a video frame buffer of a graphics controller of IHS 110, a hypertext transfer protocol (HTTP) layer, a hypertext transfer protocol secure (HTTPS) layer, or any other transaction mechanism suitable for packetizing data and establishing protection for a transfer of data between IHSFW driver 162 and BMC 185.

IHSFW driver 162 can determine a transfer size of a requested feature. IHSFW driver 162 can use a determined transfer size of a requested feature, in part, to select a transport route 320 from connectivity points determined to be available by IHSFW driver 162. In particular, IHSFW driver 162 can identify connectivity points that are not in use by IHS 110 and can select a transport route 320 from the available connectivity points having a bandwidth that can accommodate the transfer size. In one embodiment, a transfer size may be or include a file size associated with a file to be transferred. In another embodiment, a transfer size may be or include a size associated with an array of entries such as directory content information, for example. In one embodiment, each requested feature is transferred in the form of data packets that comprise a portion of the overall transfer size of the requested feature. IHSFW driver 162 can select a transport route 320 having a bandwidth which requires the least amount of data packets comprising the requested feature to be transferred. For example, IHSFW driver 162 may identify connectivity points A, B, and C comprising buffers capable of storing 1 MB, 2 MB, and 3 MB, respectively. If IHSFW driver 162 determines the transfer size of a requested feature to be 5 MB, IHSFW driver 162 may select connectivity point C to be used as transport route 320 as connectivity point C requires the transfer of only two data packets. Specifically, receiving the 5 MB feature requires one transfer of 3 MB and one transfer of 2 MB. In this way, IHSFW driver 162 can select a transport route 320 that ensures the most efficient transfer of features between IHSFW driver 162 and BMC 185.

In addition to selecting a transport route 320 based on a transfer size of the feature and bandwidth of connectivity points, IHSFW driver 162 further bases transport route 320 selection on connectivity points that are not currently in use by IHS 110. In the example above, IHSFW driver 162 may determine that connectivity point A is busy storing data for an application executing on IHS 110 while connectivity points B and C are available for immediate use. Here, rather selecting connectivity point A to serve as transport route 320, IHSFW driver 162 may select connectivity point B given that it has the second largest bandwidth (2 MB) of the three connectivity points and is available for immediate use. In one embodiment, this selection may be based on an urgency in which a feature is needed. For example, if a feature is requested that is required for urgent use, IHSFW driver 162 may select a transport route 320 having a highest bandwidth of the available connectivity points although other connectivity points that are currently unavailable may have higher bandwidths. Thus, IHSFW driver 162 may use logic to refrain from selecting a connectivity point having a largest bandwidth to serve as transport route 320 if it is currently in use, and instead base the selection on a transfer size of the requested feature and the bandwidths corresponding to available connectivity points. In one embodiment, IHSFW driver 162 may determine available connectivity points based on a network connection status. In another embodiment, IHSFW driver 162 may determine available connectivity points based on a lock status (e.g., such as that used to prevent overwrite and premature reading) associated with connectivity points indicating availability for use. In yet another embodiment, each connectivity point may be associated with a mechanism that can check availability status and indicate connectivity point availability to IHSFW driver 162 accordingly. If a transport route 320 connection is lost, IHSFW driver 162 may attempt to recover a connection to transport route 320 and/or log or report a failure in connection.

As illustrated in FIG. 3, IHSFW driver 162 can transmit 300 the request for the feature via transport route 320 to interface 280 of BMC 185. IHSFW driver 162 can establish a data stream with BMC 185 to receive 310 the requested feature in a sequence of data packets via transport route 320. In one embodiment, the requested feature may be accessed by IHSFW driver 162 via a file system presented by BMC 185. For example, IHSFW driver 162 can request data used to support a UEFI executable file from BMC 185 and receive the data via a file allocation table (FAT) file system presented by BMC 185 via transport route 320. To send and receive features via transport route 320, IHSFW driver 162 can first establish an agreement with transport route 320 to ensure that data stored in transport route 320 is not overwritten. In one embodiment, IHSFW driver 162 can establish an agreement with transport route 320 using a trivial file transfer protocol (TFTP) which employs the user datagram protocol (UDP) to transfer data via transport route 320 between IHSFW driver 162 and BMC 185. In other embodiments, IHSFW driver 162 may establish an agreement using a file transfer protocol (FTP), hypertext transfer protocol (HTTP), FTP over secure sockets layer (FTP over SSL), secure shell FTP (SFTP), or any other suitable protocol used to securely transfer files between IHSFW driver 162 and BMC 185.

Figure 4:
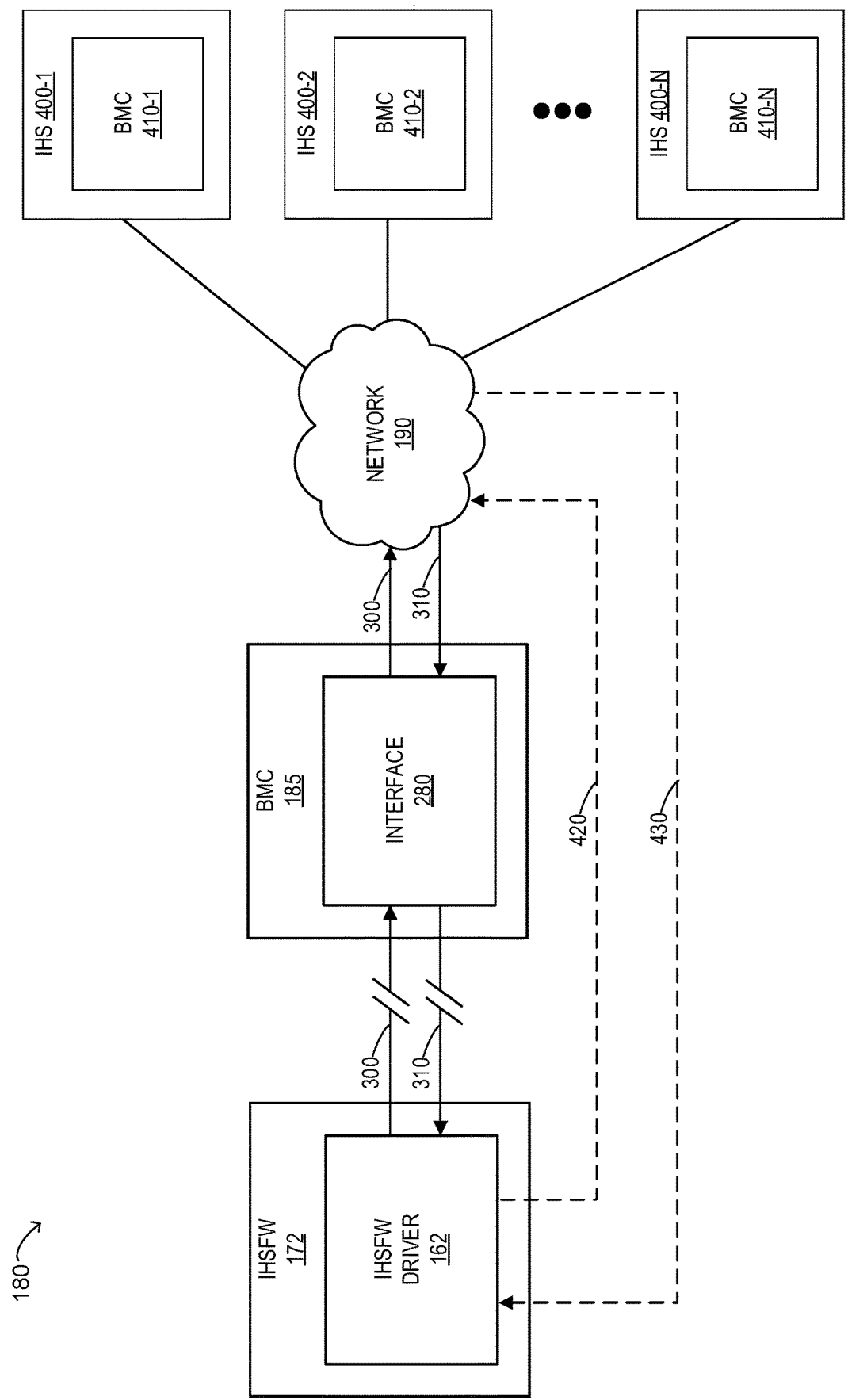
FIG. 4 illustrates a block diagram of selected elements of an embodiment for receiving a requested feature from a baseboard management controller over a network using an information handling system firmware driver.

FIG. 4 illustrates a block diagram of selected elements of an embodiment for receiving a requested feature from a baseboard management controller over a network using an information handling system firmware driver. In the embodiment illustrated in FIG. 4, IHSFW driver 162 may determine that a requested feature is not stored locally in BMC 185, has been corrupted, or is otherwise unavailable for use. Therefore, IHSFW driver 162 may instead retrieve the requested feature from BMCs 410-1 through 410-N (collectively referred to herein as BMCs 410) of IHSs 400-1 through 400-N (collectively referred to herein as IHSs 400) of computing environment 180.

In one embodiment, IHSFW driver 162 may retrieve a requested feature from BMCs 410 via network 190. In particular, IHSFW driver 162 may identify BMCs 410 in computing environment 180 that are communicatively coupled to BMC 185 and can select a BMC 410 storing the requested feature. In one embodiment, IHSFW driver 162 may employ a routing table in order to identify BMCs 410. In another embodiment, IHSFW driver 162 may identify BMCs 410 based on IP address. For example, if each BMC 410 in computing environment 180 is represented by a uniform IP address, IHSFW driver 162 may access each BMC 410 via network 190. In yet another embodiment, an administrator of IHS 110 may provide IHSFW driver 162 with instructions (e.g., via CLI, IPMI, and the like) regarding which BMC 410 in computing environment 180 may be accessed to retrieve the requested feature. Once the BMC 410 has been selected, IHSFW driver 162 may transmit 420 the request for the feature to the selected BMC 410 via network 190 and can receive 430 the requested feature from the selected BMC 410.

In one embodiment (similar to that illustrated in FIG. 3), IHSFW driver 162 may transmit 300 a request for a feature via transport route 320 (not shown) to interface 280 of BMC 185. However, upon determining that the requested feature is not stored in BMC 185 (e.g., in volatile memory medium 250 or non-volatile memory medium 270), BMC 185 may identify each BMC 410 in computing environment 180, select a BMC 410 storing the requested feature, transmit 300 the request for the feature to the selected BMC 410, and receive 310 the requested feature from the selected BMC 410. Once the requested feature is received by BMC 185, IHSFW driver 162 may receive 310 the requested feature from BMC 185 via transport route 320 as described above with respect to FIG. 3.

Figure 5:
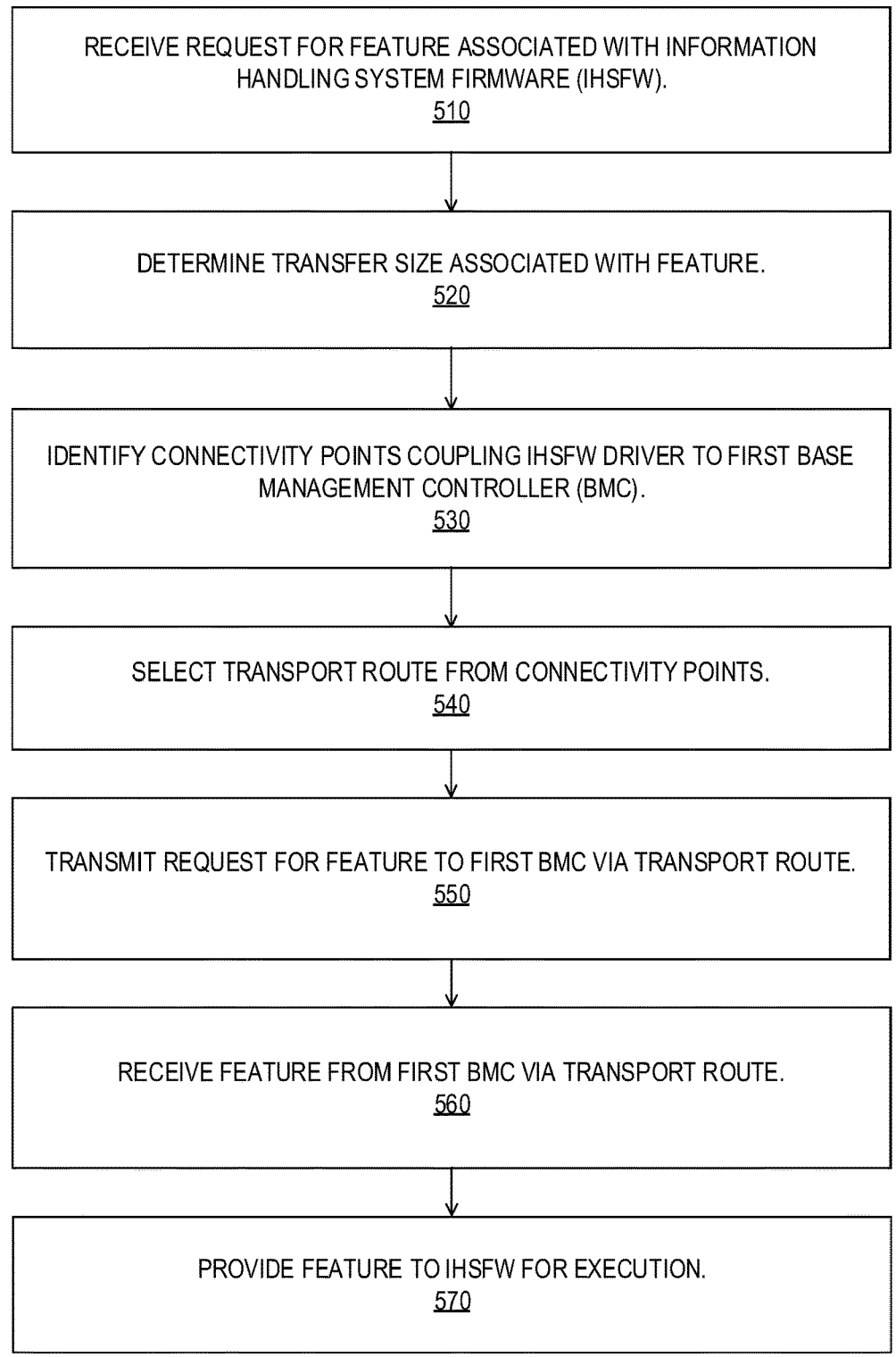
FIG. 5 illustrates a flowchart of selected elements of an embodiment of a method for identifying a transport route to a baseboard management controller using an information handling system firmware driver.

FIG. 5 illustrates a flowchart of selected elements of an embodiment of a method for identifying a transport route to a baseboard management controller using an information handling system firmware driver. It is noted that certain operations described in method 500 may be optional or may be rearranged in different embodiments.

In the method 500 illustrated in FIG. 5, information handling system firmware (IHSFW) driver 162 can receive 510 a request for a feature associated with information handling system firmware (IHSFW) 172. The feature may be stored in a first baseboard management controller (BMC) 185 of IHS 110. IHSFW driver 162 can determine 520 a transfer size associated with the feature. IHSFW driver 162 can identify 530 connectivity points communicatively coupling IHSFW driver 162 to first BMC 185. Each of the connectivity points is associated with a bandwidth. IHSFW driver 162 can select 540 a transport route from the connectivity points based in part on the transfer size associated with the feature. In response to selecting the transport route, IHSFW driver 162 can transmit 550 the request for the feature to the first BMC 185 via the transport route and can receive 560 the feature from the first BMC 185 via the transport route. IHSFW driver 162 can provide 570 the feature to IHSFW 172 for execution.

Figure 6:
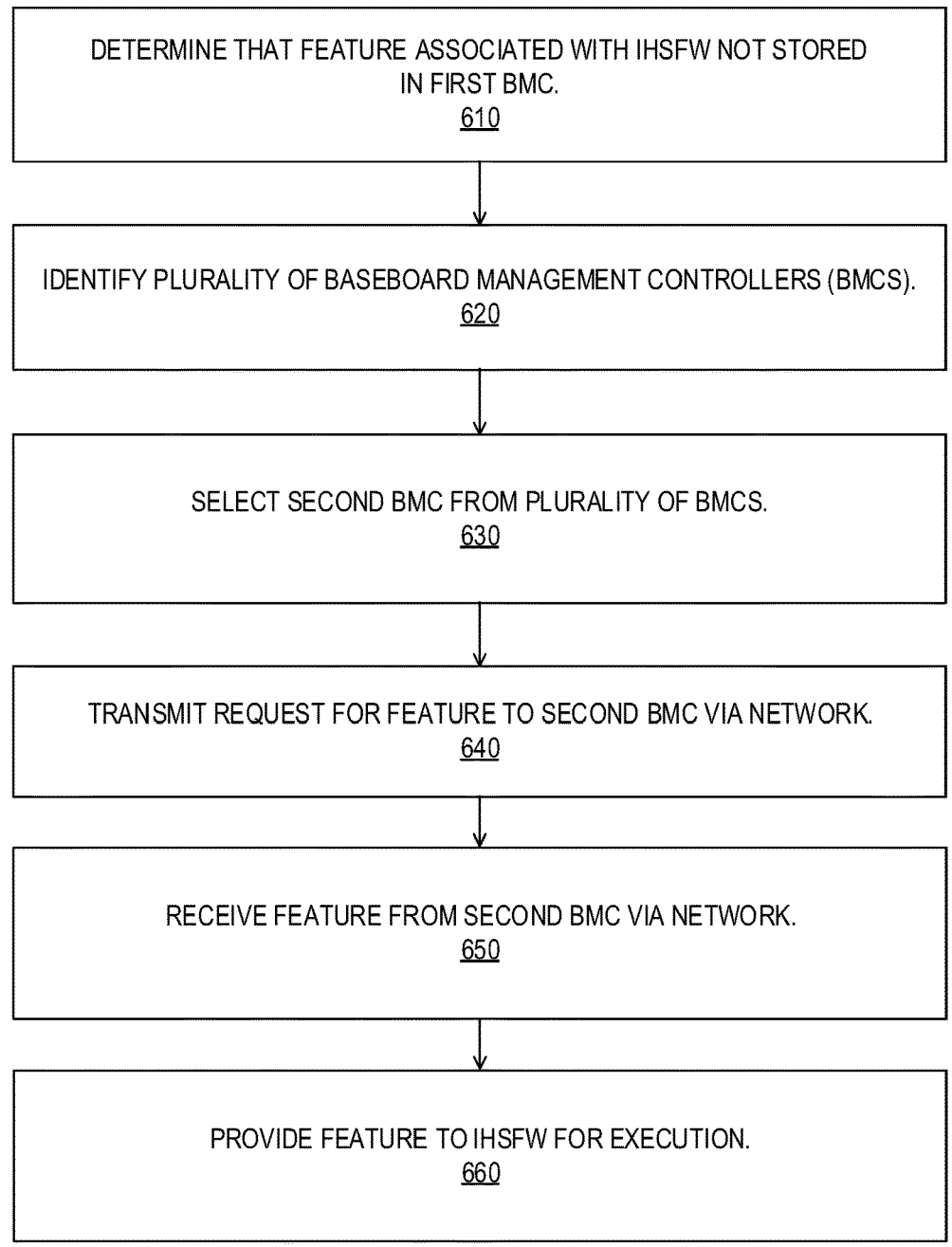
FIG. 6 illustrates a flowchart of selected elements of an embodiment of a method for identifying a transport route via a network to a baseboard management controller using an information handling system firmware driver.

FIG. 6 illustrates a flowchart of selected elements of an embodiment of a method for identifying a transport route via a network to a baseboard management controller using an information handling system firmware driver. It is noted that certain operations described in method 600 may be optional or may be rearranged in different embodiments.

In the method 600 illustrated in FIG. 6, IHSFW driver 162 can determine 610 that the feature associated with IHSFW 172 is not stored in the first BMC 185. IHSFW driver 162 can identify 620 a plurality of BMCs 410 where each BMC is communicatively coupled to the first BMC 185 via network 190. IHSFW driver 162 can select 630 a second BMC from the plurality of BMCs 410 that is storing the feature associated with IHSFW 172. In response to selecting the second BMC, IHSFW driver 162 can transmit 640 the request for the feature to the second BMC via network 190 and can receive 650 the feature from the second BMC via network 190. IHSFW driver 162 can provide 660 the feature to IHSFW 172 for execution.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, by an information handling system firmware (IHSFW) driver, a request for a feature associated with IHSFW, the feature stored in a first baseboard management controller (BMC) of an information handling system (IHS);
   determining, by the IHSFW driver, a transfer size associated with the feature;
   identifying, by the IHSFW driver, a plurality of connectivity points, each of the plurality of connectivity points communicatively coupling the IHSFW driver to the first BMC, and each of the plurality of connectivity points associated with a bandwidth;
   selecting, by the IHSFW driver, a transport route from the plurality of connectivity points, the selecting based in part on the transfer size associated with the feature; and
   in response to selecting the transport route by the IHSFW driver:
      transmitting, by the IHSFW driver, the request for the feature to the first BMC via the transport route;

receiving, by the IHSFW driver, the feature from the first BMC via the transport route; and providing, by the IHSFW driver, the feature to the IHSFW for execution.

2. The method of claim 1, wherein transmitting by the IHSFW driver the request for the feature to the first BMC via the transport route further comprises:

bypassing, by the IHSFW driver, a universal serial bus (USB) communicatively coupling the IHSFW to the first BMC.

3. The method of claim 1, wherein selecting by the IHSFW driver the transport route from the plurality of connectivity points comprises:

determining, by the IHSFW driver, the bandwidth associated with each of the plurality of connectivity points;

identifying, by the IHSFW driver, from the plurality of connectivity points, a first connectivity point having a bandwidth that accommodates the transfer size associated with the feature;

determining, by the IHSFW driver, whether the first connectivity point is in use by the IHS; and in response to determining by the IHSFW driver that the first connectivity point is not in use by the IHS, selecting, by the IHSFW driver, the first connectivity point to serve as the transport route.

4. The method of claim 3, wherein determining by the IHSFW driver whether the first connectivity point is in use by the IHS further comprises:

in response to determining by the IHSFW driver that the first connectivity point is in use by the IHS:

identifying, by the IHSFW driver, from the plurality of connectivity points, a second connectivity point that is not in use by the IHS, the second connectivity point having the bandwidth that accommodates the transfer size associated with the feature; and selecting, by the IHSFW driver, the second connectivity point to serve as the transport route.

5. The method of claim 3, wherein the bandwidth that accommodates the transfer size associated with the feature comprises a bandwidth in which a least amount of data packets may be transferred from the first BMC to the IHSFW driver, wherein each data packet comprises a portion of the feature.

6. The method of claim 1, wherein the transport route comprises at least one of:

a common internet file system (CIFS);
a network interface controller (NIC) buffer;
a network file system (NFS);
a shared memory of the IHS;
a video frame buffer of the IHS;
a hypertext transfer protocol (HTTP) layer; and
a hypertext transfer protocol secure (HTTPS) layer.

7. The method of claim 1, wherein the feature associated with the IHSFW is at least one of:

a unified extensible firmware interface (UEFI) executable file;
diagnostics firmware;
one or more configuration files; and
one or more log files.

8. A system comprising a processor having access to memory media storing executable instructions that are executed by the processor to perform operations comprising:

receiving, by an information handling system firmware (IHSFW) driver, a request for a feature associated with IHSFW, the feature stored in a first baseboard management controller (BMC) of an information handling system (IHS);

determining, by the IHSFW driver, a transfer size associated with the feature;

identifying, by the IHSFW driver, a plurality of connectivity points, each of the plurality of connectivity points communicatively coupling the IHSFW driver to the first BMC, and each of the plurality of connectivity points associated with a bandwidth;

selecting, by the IHSFW driver, a transport route from the plurality of connectivity points, the selecting based in part on the transfer size associated with the feature; and in response to selecting the transport route by the IHSFW driver:

transmitting, by the IHSFW driver, the request for the feature to the first BMC via the transport route;

receiving, by the IHSFW driver, the feature from the first BMC via the transport route; and providing, by the IHSFW driver, the feature to the IHSFW for execution.

9. The system of claim 8, wherein transmitting by the IHSFW driver the request for the feature to the first BMC via the transport route further comprises:

bypassing, by the IHSFW driver, a universal serial bus (USB) communicatively coupling the IHSFW to the first BMC.

10. The system of claim 8, wherein selecting by the IHSFW driver the transport route from the plurality of connectivity points comprises:

determining, by the IHSFW driver, the bandwidth associated with each of the plurality of connectivity points;

identifying, by the IHSFW driver, from the plurality of connectivity points, a first connectivity point having a bandwidth that accommodates the transfer size associated with the feature;

determining, by the IHSFW driver, whether the first connectivity point is in use by the IHS; and in response to determining by the IHSFW driver that the first connectivity point is not in use by the IHS, selecting, by the IHSFW driver, the first connectivity point to serve as the transport route.

11. The system of claim 10, wherein determining by the IHSFW driver whether the first connectivity point is in use by the IHS further comprises:

in response to determining by the IHSFW driver that the first connectivity point is in use by the IHS:

identifying, by the IHSFW driver, from the plurality of connectivity points, a second connectivity point that is not in use by the IHS, the second connectivity point having the bandwidth that accommodates the transfer size associated with the feature; and selecting, by the IHSFW driver, the second connectivity point to serve as the transport route.

12. The system of claim 10, wherein the bandwidth that accommodates the transfer size associated with the feature comprises a bandwidth in which a least amount of data packets may be transferred from the first BMC to the IHSFW driver, wherein each data packet comprises a portion of the feature.

13. The system of claim 8, wherein the transport route comprises at least one of:

a common internet file system (CIFS);
a network interface controller (NIC) buffer;
a network file system (NFS);
a shared memory of the IHS;
a video frame buffer of the IHS;
a hypertext transfer protocol (HTTP) layer; and
a hypertext transfer protocol secure (HTTPS) layer.

14. The system of claim 8, wherein the feature associated with the IHSFW is at least one of:
- a unified extensible firmware interface (UEFI) executable file;
- diagnostics firmware;
- one or more configuration files; and
- one or more log files.

15. A non-transitory computer-readable medium storing software comprising instructions executable by one or more computers which, upon execution by the one or more computers, cause the one or more computers to perform operations comprising:
- receiving, by an information handling system firmware (IHSFW) driver, a request for a feature associated with IHSFW, the feature stored in a first baseboard management controller (BMC) of an information handling system (IHS);
- determining, by the IHSFW driver, a transfer size associated with the feature;
- identifying, by the IHSFW driver, a plurality of connectivity points, each of the plurality of connectivity points communicatively coupling the IHSFW driver to the first BMC, and each of the plurality of connectivity points associated with a bandwidth;
- selecting, by the IHSFW driver, a transport route from the plurality of connectivity points, the selecting based in part on the transfer size associated with the feature; and
- in response to selecting the transport route by the IHSFW driver:
  - transmitting, by the IHSFW driver, the request for the feature to the first BMC via the transport route;
  - receiving, by the IHSFW driver, the feature from the first BMC via the transport route; and
  - providing, by the IHSFW driver, the feature to the IHSFW for execution.

16. The non-transitory computer-readable medium of claim 15, wherein transmitting by the IHSFW driver the request for the feature to the first BMC via the transport route further comprises:
- bypassing, by the IHSFW driver, a universal serial bus (USB) communicatively coupling the IHSFW to the first BMC.

17. The non-transitory computer-readable medium of claim 15, wherein the transport route comprises at least one of:
- a common internet file system (CIFS);
- a network interface controller (NIC) buffer;
- a network file system (NFS);
- a shared memory of the IHS;
- a video frame buffer of the IHS;
- a hypertext transfer protocol (HTTP) layer; and
- a hypertext transfer protocol secure (HTTPS) layer.

* * * * *